United States Patent
Sang et al.

(10) Patent No.: US 7,944,921 B2
(45) Date of Patent: May 17, 2011

(54) METHOD AND SYSTEM FOR DISTRIBUTING MOBILE BROADCAST SERVICE AND MOBILE TERMINAL

(75) Inventors: Zhuo Sang, Shenzhen (CN); Zhibin Li, Shenzhen (CN)

(73) Assignee: Huawei Technologies Co., Ltd., Guangdong Province (CN)

( * ) Notice: Subject to any disclaimer, the term of this patent is extended or adjusted under 35 U.S.C. 154(b) by 580 days.

(21) Appl. No.: 11/869,626

(22) Filed: Oct. 9, 2007

(65) Prior Publication Data

US 2008/0137569 A1    Jun. 12, 2008

Related U.S. Application Data

(63) Continuation-in-part of application No. PCT/CN2006/002476, filed on Sep. 21, 2006.

(30) Foreign Application Priority Data

Oct. 11, 2005   (CN) .......................... 2005 1 0100292

(51) Int. Cl.
*H04L 12/28* (2006.01)

(52) U.S. Cl. ...................................... 370/392; 370/410

(58) Field of Classification Search .................. 370/338, 370/389, 392, 390, 401, 410
See application file for complete search history.

(56) References Cited

U.S. PATENT DOCUMENTS

| | | | | |
|---|---|---|---|---|
| 6,425,125 B1 * | 7/2002 | Fries et al. | ..................... | 717/168 |
| 6,553,147 B2 * | 4/2003 | Chai et al. | ...................... | 382/240 |
| 7,299,463 B2 * | 11/2007 | Brannock et al. | ............. | 717/169 |
| 7,330,449 B2 * | 2/2008 | Takahashi et al. | ............ | 370/331 |
| 2002/0120885 A1 * | 8/2002 | Choi et al. | ........................ | 714/38 |
| 2003/0193949 A1 * | 10/2003 | Kojima et al. | ................ | 370/392 |
| 2005/0123042 A1 * | 6/2005 | Park | .......................... | 375/240.12 |
| 2005/0226227 A1 * | 10/2005 | Kim et al. | ...................... | 370/352 |
| 2006/0146817 A1 * | 7/2006 | Lim | .............................. | 370/389 |
| 2007/0288914 A1 * | 12/2007 | Brannock et al. | ............. | 717/169 |
| 2008/0013660 A1 * | 1/2008 | Ojard et al. | .................... | 375/355 |
| 2010/0032979 A1 * | 2/2010 | Czornyj et al. | .......... | 296/107.19 |
| 2010/0083041 A1 * | 4/2010 | Lim | ................ | 714/15 |

FOREIGN PATENT DOCUMENTS

| | | |
|---|---|---|
| CN | 1416648 A | 5/2003 |
| CN | 1439229 A | 8/2003 |
| JP | 2004118984 A | 4/2004 |
| WO | 2004/056096 A | 7/2004 |

OTHER PUBLICATIONS

English language translation for Written Opinion for PCT/CN2006/002476.

* cited by examiner

*Primary Examiner* — Andrew Lee
(74) *Attorney, Agent, or Firm* — Ladas & Parry, LLP

(57) ABSTRACT

A method and a system for distributing a mobile broadcast service are provided. The method includes: adding header information into broadcast service contents, the header information comprising integrality information and version information of a service packet containing the broadcast service contents; distributing the service packet to a user terminal; updating or accepting, by the user terminal, its own service data by use of the service packet in accordance with the integrality information and version information of the service packet. The method and the system according to the embodiments in the present invention may bring about higher transmission efficiency of data packet.

12 Claims, 4 Drawing Sheets

| Info of header | | ID0 | ID1 | | IDn |
|---|---|---|---|---|---|
| f/p(bool) | Version(int) | contents | contents | ...... | contents |

Figure 4

| Info of header | | New contents | | | Change contents | | | Delete contents | | |
|---|---|---|---|---|---|---|---|---|---|---|
| f/p (bool) | Version (int) | ID0 contents | ... | IDn contents | ID0 contents | ... | IDn contents | ID0 contents | ... | IDn contents |

Figure 5

METHOD AND SYSTEM FOR DISTRIBUTING MOBILE BROADCAST SERVICE AND MOBILE TERMINAL

CROSS-REFERENCE TO RELATED APPLICATION

This application is a Continuation-in-Part of International Patent Application No. PCT/CN2006/002476, filed Sep. 21, 2006, which claims priority to Chinese Patent Application No. 200510100292.7, filed Oct. 11, 2005, which is incorporated herein as though set forth in full.

FIELD OF THE INVENTION

The present invention relates to the field of telecommunication technology, and particularly to a method and system for distributing mobile broadcast service.

BACKGROUND OF THE INVENTION

Mobile broadcast provides broadcast services over a large area, which includes unidirectional One-to-Many (1-to-M) broadcast and bidirectional unicast in a mobile environment. Mobile broadcast covers all the 1-to-M services ranging from the traditional broadcast to the mobile broadcast, and is applied to provide the public with video, audio, multimedia and data services including conditional receiving and interactive data receiving, etc. Mobile broadcast takes the full advantage of the "point-to-multipoint" transmission approach and transmits information to the public via general receivers. Mobile broadcast transmits a great deal of information to user terminals by using asymmetric distribution infrastructure typically.

In a mobile broadcast service, service contents may be distributed to a user terminal in two ways: one way is to transmit the broadcast service contents to the user terminal via a broadcast service unit by a broadcast service distributor; the other way is to obtain the service contents via an interactive service unit by the user terminal. In the prior art, the broadcast service distributor distributes all the contents of service packets to the user terminal via the broadcast service unit or the interactive service unit in real time. Therefore, the service packets transmitted are often oversized in that there are many parts already existing in terminal, which occupy the limited transmission and equipment resources, thus reducing the efficiency of transmission.

SUMMARY OF THE INVENTION

Embodiments disclosed herein provide a method and a system for distributing a mobile broadcast service, and a mobile terminal, with higher transmission efficiency, to refine the hierarchy of an update data packet, so as to provide a more sufficient control for update, so as to solve the problem that the transmitted contents and the transmission channel of service packets are not specific.

A method for distributing a mobile broadcast service according to an embodiment of the present invention includes:
constructing header information, adding the header information into a service packet containing broadcast service contents, the header information including integrality information and version information of the service packet containing the broadcast service contents;
distributing the service packet to a user terminal.

Another method for distributing a mobile broadcast service according to an embodiment of the invention includes: receiving a service packet containing header information including integrality information and version information; updating local service data with the service packet or accepting the service packet as the local service data in accordance with the integrality information and version information of the service packet.

A system for distributing a mobile broadcast service according to an embodiment of the invention includes a broadcast service distributor and a user terminal; wherein
the broadcast service distributor is adapted for constructing header information, adding the header information into a service packet containing broadcast service contents and distributing the service packet containing the broadcast service contents, the header information includes integrality information and version information of the service packet;
the user terminal includes a module for receiving a service packet including header information containing integrality information and version information of the service packet; and a module for updating local service data with the service packet or accepting the service packet as the local service data in accordance with the integrality information and the version information of the service packet.

A mobile terminal according to an embodiment of the invention includes:
a module for receiving a service packet including header information containing integrality information and version information of the service packet; and
a module for updating local service data with the service packet or accepting the service packet as the local service data in accordance with the integrality information and the version information of the service packet.

The technical solutions of the present invention may bring about some beneficial effects. In the method according to the embodiments of the present invention, the broadcast service distributor adds header information reflecting integrality and version information of a service packet into the broadcast service contents to be distributed, and distributes the service packet to the interactive service unit or the broadcast service unit in accordance with the integrality information and version information of the service packet as appropriate. Thus the usage of the integrality information and version information sets a condition for the broadcast service distributor to distribute a service packet. For example, it is necessary to send only the contents to be added/changed instead of all the information of a new service packet when only a portion of information of the new service packet needs to be added into or changed in the current service packet. For another example, it is necessary to send only ID of the contents to be deleted when only a portion of information of the current service packet needs to be deleted. Thereby unnecessary distribution of a service packet may be avoided and hence the data packet transmission efficiency may be improved.

Segmented information is configured in service packet information, with each segment being set with an identification number ID. In this way, the contents redundancy may be avoided as much as possible during the updating of the service packet. Accordingly, the update efficiency may be improved significantly, and the network resources may be saved. Furthermore, information for updating is also added into an update service packet. The information for updating may be divided into three portions including contents to be added, contents to be changed, and contents to be deleted. These three portions contain the contents of the corresponding segments with different IDs respectively, so that the user terminal may update the service packet stored locally more effectively.

When a user terminal does not receive an update service packet, the user terminal may send a service packet request to the interactive service unit through the interactive channel. This provides an effective fault tolerance mechanism for the user and thereby further improves the applicability of the present invention.

BRIEF DESCRIPTION OF THE DRAWINGS

FIG. 4 is a schematic showing an information structure of an integral service packet in an embodiment of the present invention; and FIG. 5 is a schematic showing an information structure of an update service packet in an embodiment of the present invention.

DETAILED DESCRIPTION OF THE EMBODIMENTS

Figure 1:
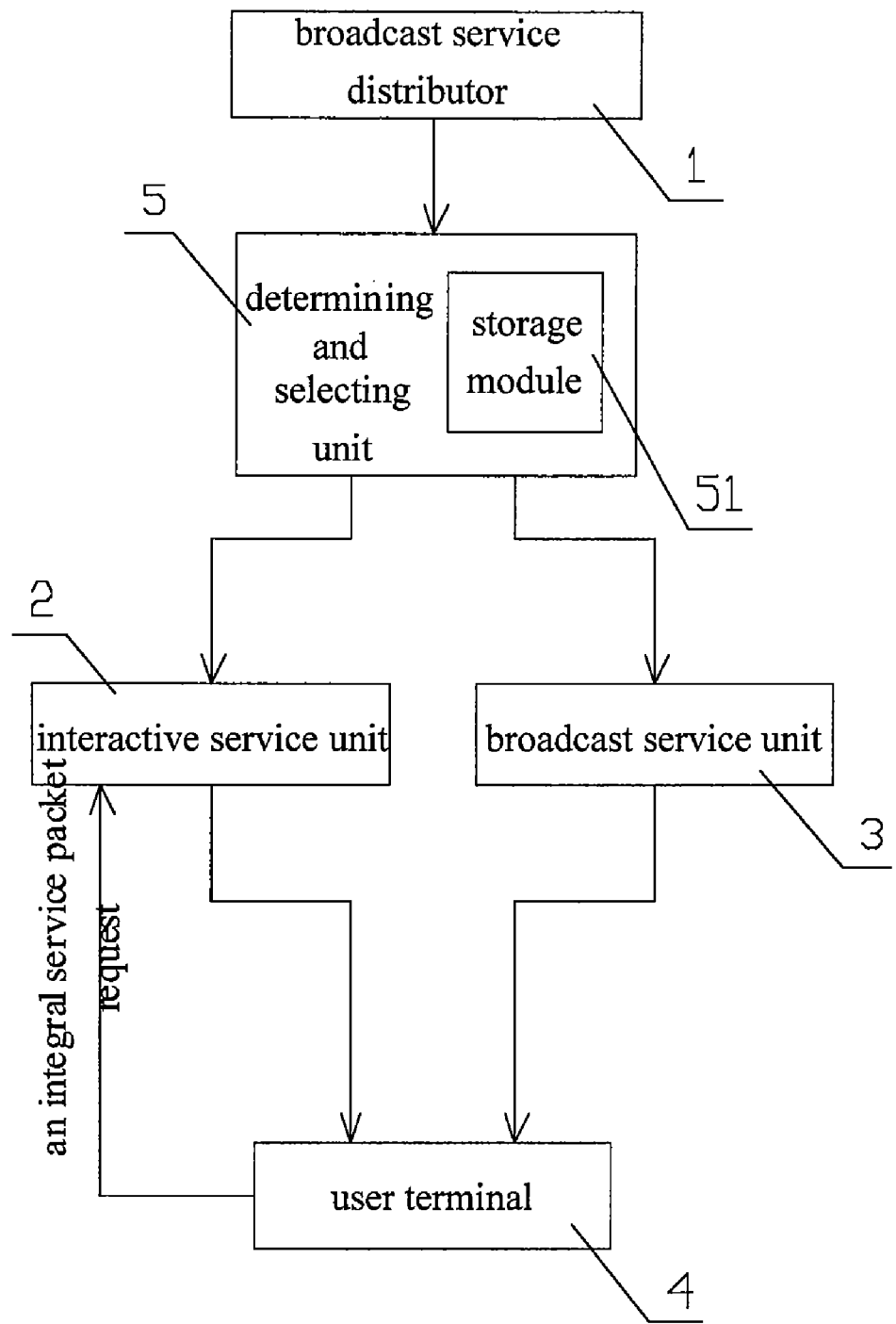
FIG. 1 is the block diagram of a system according to an embodiment of the present invention.

In a method for distributing a mobile broadcast service according to an embodiment of the present invention, header information is added into broadcast service contents, the header information includes integrality information and version information of a service packet. The service packet contains the broadcast service contents. The service packet is classified into integral service packet or update service packet in accordance with the integrality information. The version information reflects the version of a service packet. The service packet is distributed to a user terminal; the user terminal may update or accept its own service data by using the service packet in accordance with the integrality information and version information of the service packet. In an embodiment of the present invention, the content information of an update service packet may be divided into three portions including contents to be added, contents to be changed or contents to be deleted. In actual applications, the content information of an update service packet may be divided into more portions, for example, the contents to be changed may be configured into multiple levels so that different levels of the contents to be changed may be changed differently.

In one embodiment, the method according to the embodiments of the present invention may be implemented in several ways. One way is to distribute a service packet to a user terminal in accordance with the integrality of the service packet through the following steps:

First, it is determined whether a service packet is an integral service packet or an update service packet in accordance with the integrality information of the service packet. If the service packet is an integral service packet, the integral service packet of a new version is compared with the integral service packet of a current version. If the new version is higher than the current version, the integral service packet of the current version is replaced with the integral service packet of the new version, and the integral service packet of the new version is distributed to the user terminal. Otherwise the integral service packet of the new version may be discarded.

If the service packet is an update service packet, similarly the update service packet of the new version is compared with the update service packet of the current version. If the new version is higher than the current version, the update service packet of the current version is replaced with the update service packet of the new version, and the update service packet of the new version is distributed to the user terminal. Otherwise the update service packet of the new version may be discarded.

Secondly, a user terminal that has received the service packet may update or accept its own service data through the following procedures:

The user terminal determines whether the received service packet is an integral service packet or an update service packet in accordance with the integrality information of the received service packet. If the received service packet is an integral service packet, the user terminal overwrites the current service packet stored locally with the integral service packet; otherwise the user terminal compares the version of the received service packet with the version of the current service packet stored locally. If the version of the received service packet is higher than the version of the service packet stored locally and the version difference is in a predefined scope, the user terminal updates the current service packet stored locally with the received service packet. If the version of the received service packet is higher than the version of the service packet stored locally and the version difference is out of the predefined scope, the user terminal sends an integral service packet request to the network side through an interactive channel carrying the version information of the current service packet stored locally, requesting for the latest integral service packet. If the version of the received service packet is lower than or equal to the version of the service packet stored locally, the user terminal may discard the received service packet.

Usually, there are different ways for setting or counting the version, and the level of the version difference may be set as required. In this embodiment, the version is counted with natural numbers, for example, Version 1, Version 2, . . . , Version n, etc. Therefore, the level of the version difference is 1 in this embodiment.

Furthermore, the user terminal may update the service packet stored locally with the received service packet in various different ways, for example:

For contents to be added, the user terminal may insert the contents to be added directly to the service packet stored locally and then update the version of the service packet into the version of the received service packet. For contents to be changed, the user terminal may change corresponding contents in the service packet stored locally in accordance with the contents to be changed and then update the version of the service packet into the version of the received service packet. For contents to be deleted, the user terminal may delete the corresponding contents from the service packet stored locally and then update the version of the service packet stored locally into the version of the received service packet.

Hereinafter more embodiments of the present invention will be detailed with reference to the accompanying drawings.

FIG. 1 is the block diagram of a system according to an embodiment of the present invention. The system as shown in FIG. 1 includes a broadcast service distributor 1, an interactive service unit 2, a broadcast service unit 3, a user terminal 4, and a determining and selecting unit 5.

The broadcast service distributor 1 is adapted to add header information into broadcast service contents. The header information includes integrality information and version information of the service packet containing the broadcast service contents, the service packet is classified into an integral service packet or an update service packet in accordance with the integrality information, and the version information reflects the version of the service packet. Furthermore, the broadcast service distributor 1 is also adapted to distribute an integral service packet and an update service packet to the interactive service unit 2 and broadcast service unit 3. The interactive service unit 2 is adapted to receive an integral service packet and distribute the corresponding integral service packet to the user terminal 4. The broadcast service unit 3 is adapted to receive an update service packet and distribute the corresponding update service packet to the user terminal 4.

The determining and selecting unit 5 is adapted to determine the service packet containing the broadcast service contents distributed by the broadcast service distributor 1 in accordance with the integrality information, and enable the broadcast service distributor 1 to distribute the service packet to the interactive service unit 2 or broadcast service unit 3 accordingly, and thereby enable the interactive service unit 2 and broadcast service unit 3 to distribute the corresponding service packet to the user terminal 4.

In this embodiment, the determining and selecting unit 5 is provided with a storage module 51 which saves the version information of the service packet stored in interactive service unit 2 or the broadcast service unit 3.

Figure 2:
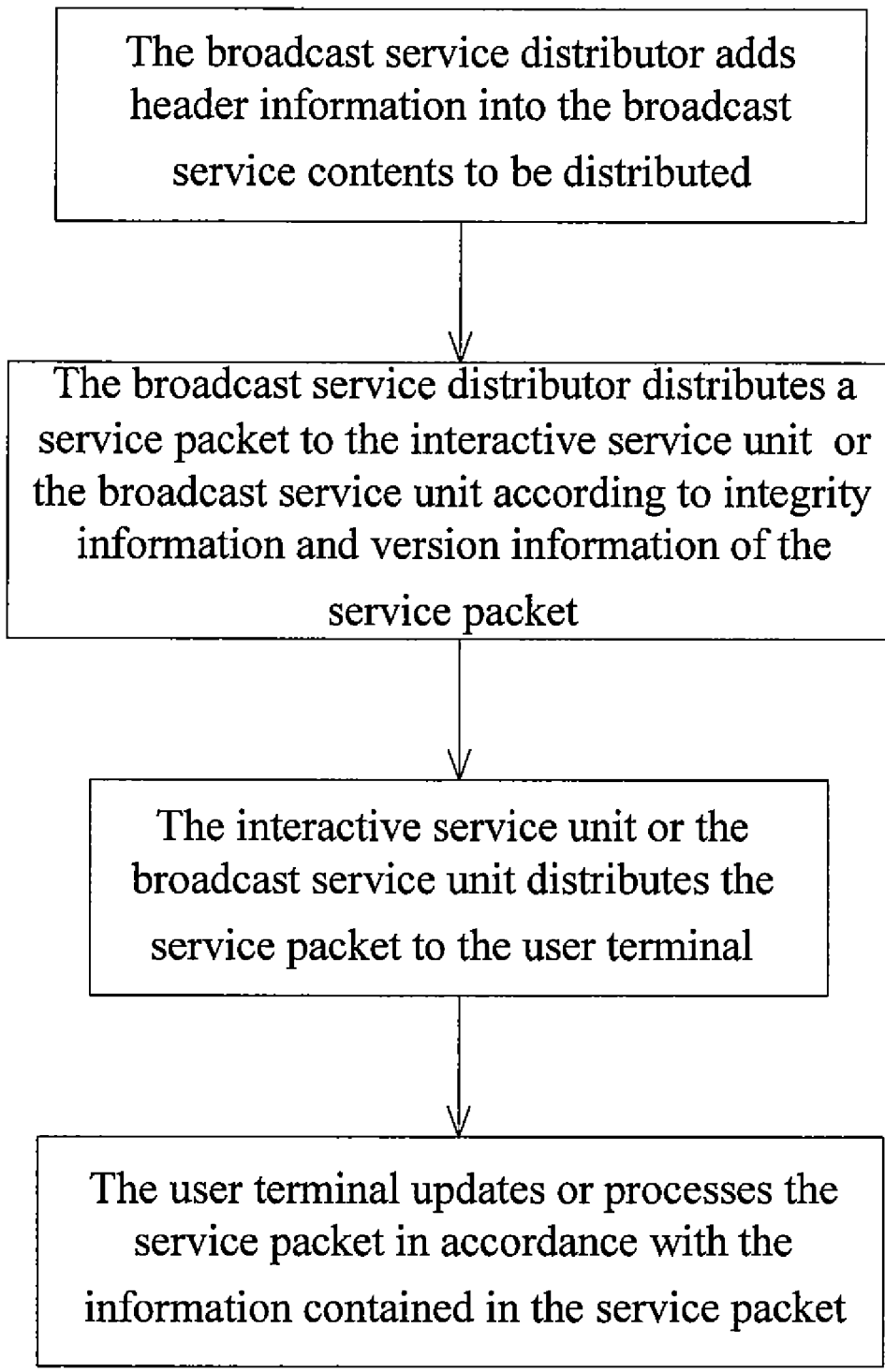
FIG. 2 shows a basic control flow of the system as shown in FIG. 1.
Figure 3:
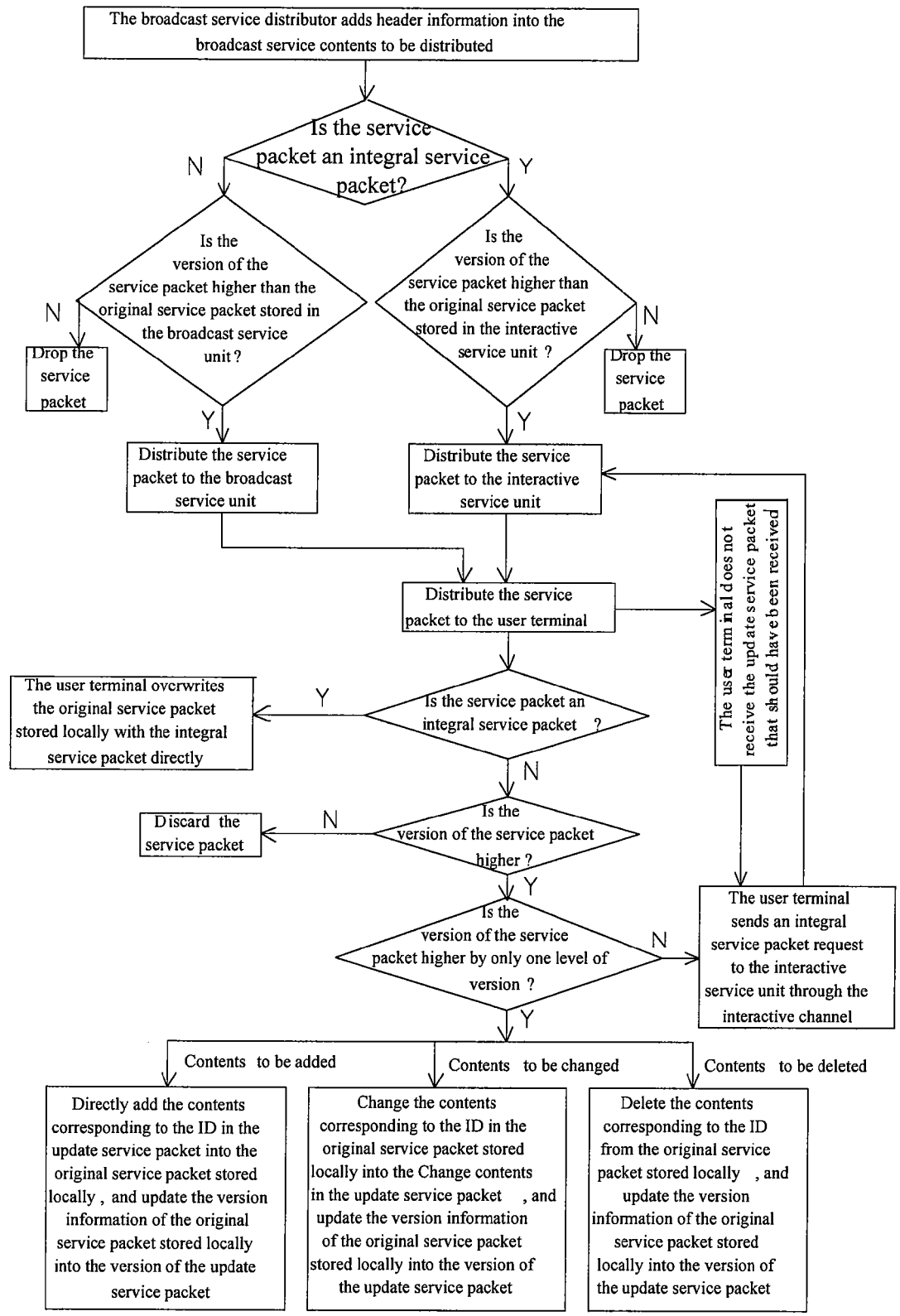
FIG. 3 is a control flow diagram of the embodiment as shown in FIG. 2.

FIG. 2 shows a basic control flow of the system as shown in FIG. 1; and FIG. 3 is a control flow diagram of the embodiment as shown in FIG. 2. As shown in FIG. 1 and FIG. 2:

1) The broadcast service distributor 1 adds header information into the broadcast service contents to be distributed. The header information includes at least integrality information and version information of the service packet containing the broadcast service contents, the service packet is classified into an integral service packet or an update service packet in accordance with the integrality information, and the version information reflects the version of the service packet.

2) The determining and selecting unit 5 determines the integrality information and version information of the service packet as follows:
   21) If the service packet is an integral service packet and the version of the service packet is higher than the version of the service packet stored in the interactive service unit 2, the service packet will be transmitted to the interactive service unit 2;
   22) If the service packet is an update service packet and the version of the service packet is higher than the version of the service packet stored in the broadcast service unit 3, the service packet will be transmitted to the broadcast service unit 3.

3) The interactive service unit 2 or the broadcast service unit 3 distributes the service packet to the user terminal 4.

4) The user terminal 4 updates or processes the service packet in accordance with the information contained in the service packet.

When the condition of integrality information and the condition of version information are met at the same time, these conditions constitute the sufficient condition for distributing the service packet to the interactive service unit or broadcast service unit. In other words, the interactive service unit 2 or broadcast service unit 3 will distribute the service packet to the user terminal 4.

Reference will be turned to FIG. 3 below:

1. The broadcast service distributor 1 adds header information into the service packet containing the broadcast service contents to be distributed, the header information includes integrality information and version information.

As shown in FIG. 4, in the integral service packet, the service contents are divided into n segments based on the principle of independence and self-containing. Each segment has a specific ID and contents, each ID is a global parameter and corresponds to the contents of a unique segment exclusively. The integrality information f/p is a Boolean variable. If f/p is true, it indicates that the service packet is an integral service, and if f/p is false, it indicates that the service packet is an update service packet. The Version field is the unique ID of the version of the service packet and is an Integer variable. The version of the service packet depends on the time when the service packet is generated. The higher the version is, the greater the Version value will be; on the other hand, the lower the version is, the smaller the Version value will be.

As shown in FIG. 5, in the update service packet, the header information portion "Info of header" is identical with that in the integral service packet. The content information includes three portions: contents to be added (New contents), contents to be changed (Change contents), contents to be deleted (Delete contents). These three portions contain the field identifications, the corresponding identification numbers IDs, and the contents of the segments corresponding to the IDs. The field identifications identify the contents to be added, contents to be changed, contents to be deleted respectively.

2. The determining and selecting unit 5 processes as follows in accordance with the integrality information of the service packet:

21. If the integrality information indicates that the service packet is an integral service packet, the determining and selecting unit 5 will compare the version of the integral service packet with the version of the current integral service packet stored in the interactive service unit 2 (in the embodiment of the present invention, the version information of the current integral service packet stored in the interactive service unit 2 is stored in the storage module 51), and execute the following process:

211. if the version of the integral service packet is higher than the version of the current integral service packet stored in the interactive service unit 2, the determining and selecting unit 5 distributes the service packet to the interactive service unit 2, and enables the current integral service packet stored in the interactive service unit 2 to be overwritten with the service packet, and updates the information stored in the storage module 51 accordingly;

212. if the version of the service packet is lower than or equal to the version of the current integral service packet stored in the interactive service unit 2, the determining and selecting unit 5 discards the service packet.

22. If the integrality information indicates that the service packet is an update service packet, the determining and selecting unit 5 will compare the version of the service packet with the version of the current update service packet stored in the broadcast service unit 3 (in the embodiment of the present invention, the version information of the current update service packet stored in the broadcast service unit 3 is stored in the storage module 51), and execute the following process:

221. If the version of the service packet is higher than the version of the current update service packet stored in the broadcast service unit 3, the determining and selecting unit 5 distributes the service packet to the broadcast service unit 3, and enables the current update service packet stored in the broadcast service unit 3 to be overwritten with the service packet, and updates the information stored in the storage module 51 accordingly;

222. if the version of the service packet is lower than or equal to the version of the current integral service packet stored in the interactive service unit 2, the determining and selecting unit 5 discards the service packet.

3. The interactive service unit 2 or the broadcast service unit 3 distributes the service packet to the user terminal 4. For an update service packet, if any error occurs during the distribution procedure and thus the user terminal 4 can not receive the current update service packet, the user terminal 4 will send an integral service packet request to the interactive service unit 2 through the interactive channel requesting for the latest integral service packet. The interactive service unit 2 will distribute the requested integral service packet to the user terminal 4.

4. The user terminal 4 processes the service packet as follows in accordance with the header information in the service packet:

41. If the integrality information indicates that the service packet is an integral service packet, the user terminal 4 will overwrite the current service packet stored locally with this integral service packet directly.

42. If the integrality information indicates that the service packet is an update service packet, the user terminal 4 will determine the version of the update service packet in accordance with the header information and processes as follows:

421. If the version of the update service packet is lower than or equal to the version of the current service packet stored locally in the user terminal 4, the user terminal discards the update service packet;

422. If the version of the update service packet is higher than the version of the current service packet stored locally in the user terminal 4, the user terminal executes the following process:

4221. If the version of the update service packet is higher than the version of the current service packet stored in the user terminal by only one level of version, the user terminal 4 will query in the contents of the service packet for the field identification identifying contents to be added, contents to be changed, or contents to be deleted and the corresponding identification number ID, and updates the current service packet stored locally with the update service packet as follows:

42211. For contents to be added, the user terminal directly inserts the contents corresponding to the ID in the update service packet into the current service packet stored locally, and updates the version information of the current service packet stored locally into the version of the update service packet;

42212. For contents to be changed, the user terminal changes the contents corresponding to the ID in the current service packet stored locally into the contents to be changed in the update service packet, and updates the version information of the current service packet stored locally into the version of the update service packet;

42213. For contents to be deleted, the user terminal deletes the contents corresponding to the ID from the current service packet stored locally, and updates the version information of the current service packet stored locally into the version of the update service packet.

4222. If the version of the service packet is higher than the version of the current service packet stored in the user terminal by two or more levels of version, the user terminal 4 will send an integral service packet request to the interactive service unit 2 through the interactive channel requesting for the latest integral service packet. The interactive service unit 2 will distribute the requested integral service packet to the user terminal 4.

The process 4221-4222 are optional. In another embodiment, when it is determined that the version of the update service packet is higher than the version of the current service packet stored locally in the user terminal 4, the user terminal may update the current service packet stored locally with the update service packet.

In an embodiment of the present invention, the determining and selecting unit 5 may obtain the version information of the service packet stored in the interactive service unit 2 or the broadcast service unit 3 through a direct information interaction with the interactive service unit 2 or the broadcast service unit 3. In this case, the storage module 51 may be omitted. This alteration may be recognized by a person of ordinary skill readily, and therefore will not be repeated here.

In an embodiment of the present invention, the determining and selecting unit 5 may be integrated in the broadcast service distributor 1. This alteration may be recognized by a person of ordinary skill readily, and therefore will not be repeated here.

It shall be understood that the above descriptions of the particular embodiments according to the present invention are relatively specific and can not be construed as limiting the protection scope of the present invention, and the protection scope of the present invention shall be based on the appended claims.

What is claimed is:

1. A method for distributing a mobile broadcast service, comprising:
   receiving a service packet containing header information comprising integrality information and version information;
   accepting the service packet as local service data, or updating the local service data with the service packet, in accordance with the integrality information and version information of the service packet;
   wherein the version information reflects version of the service packet; the local service data is a current service packet stored locally;
   when the service packet is identified as an update service packet by the integrality information, the method further comprises:
   comparing a version of the update service packet with a version of the current service packet stored locally;
   updating the current service packet stored locally with the update service packet if the version of the update service packet is higher than the version of the current service packet stored locally and a version difference is in a predefined scope; and
   sending an integral service packet request to network side through an interactive channel requesting for a latest integral service packet if the version of the update service packet is higher than the version of the current service packet stored locally and the version difference is out of the predefined scope, the integral service packet request containing version information of the current service packet stored locally.

2. The method according to claim 1, wherein before receiving the service packet, the method further comprises:
   sending a service packet request to network side through an interactive channel.

3. The method according to claim 1, wherein when the service packet is identified as an integral service packet by the integrality information,
   accepting the service packet as the local service data comprises: overwriting a current service packet stored locally with the integral service packet.

4. The method according to claim 1, wherein updating the current service packet stored locally with the update service packet comprises:

comparing contents of the update service packet with that of the current service packet stored locally;
if the update service packet contains contents to be added, inserting the contents to be added into the current service packet stored locally; or
if the update service packet contains contents to be changed, changing contents in the current service packet stored locally in accordance with the contents to be changed; or
if the update service packet contains contents to be deleted, deleting the contents to be deleted from the current service packet stored locally in accordance with the contents to be deleted, and
updating the version of the current service packet stored locally into the version of the received update service packet.

5. The method according to claim 1, wherein before receiving the service packet, the method further comprises:
constructing the header information, adding the header information into the service packet containing broadcast service contents, the header information comprising integrality information and version information of the service packet containing the broadcast service contents, the service packet being identified as an integral service packet or an update service packet according to the integrality information; and
distributing the service packet.

6. The method according to claim 5, wherein contents of the integral service packet are divided into a plurality of segments, each segment has an identification and contents, each identification corresponds to contents of a unique segment.

7. The method according to claim 5, wherein contents of the update service packet are classified into contents to be added, contents to be changed, or contents to be deleted.

8. A mobile terminal, comprising:
a module, for receiving a service packet comprising header information containing integrality information and version information of the service packet; and
a module, for updating local service data with the service packet or accepting the service packet as the local service data in accordance with the integrality information and the version information of the service packet;
wherein the version information reflects version of the service packet; the local service data is a current service packet stored locally;
when the service packet is identified as an update service packet by the integrality information, the module for updating is further adapted for
comparing a version of the update service packet with a version of the current service packet stored locally;
updating the current service packet stored locally with the update service packet if the version of the update service packet is higher than the version of the current service packet stored locally and a version difference is in a predefined scope; and
sending an integral service packet request to network side through an interactive channel requesting for a latest integral service packet if the version of the update service packet is higher than the version of the current service packet stored locally and the version difference is out of the predefined scope; the integral service packet request carries version information of the current service packet stored in the service terminal.

9. The mobile terminal according to claim 8, wherein when the service packet is identified as an integral service packet by the integrality information, the module for updating is further adapted for overwriting a current service packet stored locally with the integral service packet.

10. A system for distributing a mobile broadcast service, comprising
a broadcast service distributor, adapted for constructing header information, adding the header information into a service packet containing broadcast service contents, and distributing the service packet containing the broadcast service contents; wherein the header information comprises integrality information and version information of the service packet;
a user terminal, comprising a module for receiving a service packet comprising header information containing integrality information and version information of the service packet; and a module for updating local service data with the service packet or accepting the service packet as the local service data in accordance with the integrality information and the version information of the service packet;
wherein the version information reflects version of the service packet; the local service data is a current service packet stored locally;
when the service packet is identified as an update service packet by the integrality information, the module for updating is further adapted for
comparing a version of the update service packet with a version of the current service packet stored locally;
updating the current service packet stored locally with the update service packet if the version of the update service packet is higher than the version of the current service packet stored locally and a version difference is in a predefined scope; and
sending an integral service packet request to network side through an interactive channel requesting for a latest integral service packet if the version of the update service packet is higher than the version of the current service packet stored locally and the version difference is out of the predefined scope; the integral service packet request containing version information of the current service packet stored locally.

11. The system according to claim 10, wherein the broadcast service distributor is further adapted for comparing a service packet of a new version with a service packet of a current version before distributing the service packet, and replacing the service packet of the current version with the service packet of the new version when the new version is higher than the current version.

12. The system according to claim 10, wherein when the service packet is identified as an integral service packet by the integrality information, the module for accepting is further adapted for overwriting a current service packet stored locally with the integral service packet.

* * * * *